Oct. 8, 1946.  M. RESK  2,408,811

PROFESSIONAL PHOTOGRAPHIC CAMERA

Filed Aug. 12, 1943  3 Sheets-Sheet 1

INVENTOR.
Michel Resk
BY
Zoltan H. Holachek
ATTORNEY

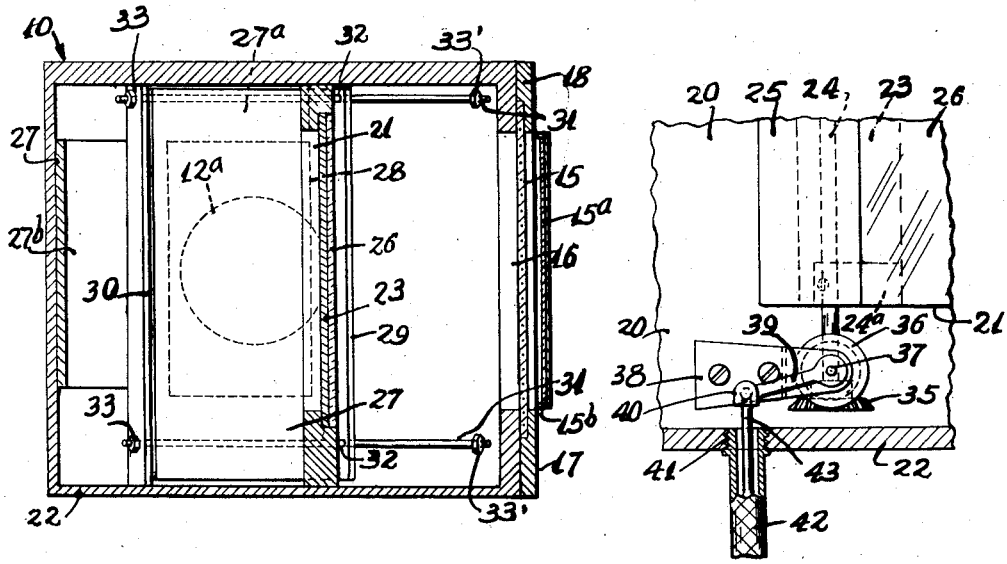
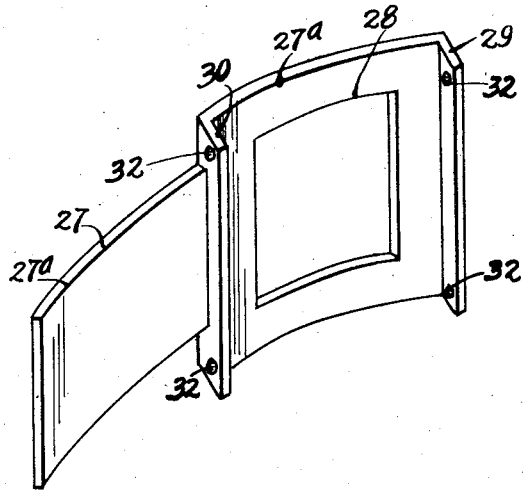
Fig. 4.  Fig. 6.  Fig. 5.
INVENTOR.
Michel Resk

Patented Oct. 8, 1946

2,408,811

UNITED STATES PATENT OFFICE 2,408,811

PROFESSIONAL PHOTOGRAPHIC CAMERA

Michel Resk, New Rochelle, N. Y.

Application August 12, 1943, Serial No. 498,276

7 Claims. (Cl. 95—42)

1

This invention relates to new and useful improvements in a professional type of photographic camera.

This invention is a further development on my previous photographic camera, Patent Number 2,225,351, issued on December 17, 1940.

Still further the invention proposes the construction of a photographic camera for professional or amateur use. This invention proposes to provide the camera with a shutter mechanism of simple construction involving the use of very few parts, which will facilitate the work for the operator and allow a better control of the subject image so that the operator may see his subject which is to be photographed, in the upright position for better focusing and composing and to provide a camera in which it is possible to see the image of the subject continuously and permit the operator to operate the shutter without winding or manually changing the positions of the mirrors, and without going through any mechanical manipulation, thereby ascertaining that the operator's attention is focused only on the image of his subject which is being photographed.

It is still a further object of this invention to produce a very inexpensive camera which will always be operative, will not get out of order, and will require little attention to operate.

A further object of the invention proposes characterizing the camera by a hollow light-proof body having a lens mounted through the front wall thereof with a plate or film holder on the back wall thereof and a ground glass or the like plate mounted across an opening in the side wall of the body with a diagonal wall fixedly mounted across the interior of the body, separating the side wall and back wall in a manner to permit a picture to be first focused in the ground glass and then recorded on the film.

Still further it is proposed to provide the fixed diagonal wall with an opening for the passage of light from the lens to the film holder with a light-proof frame extended across the opening and carrying a mirror arranged in a manner to reflect an image passing through the lens on to the ground glass.

Still further it is proposed to pivotally mount the light-proof frame reflector and provide a means for pivoting this reflector across the lens and across the opening which is provided with the ground glass in a manner to light seal the interior of the camera and open the opening in the diagonal wall to permit the image to be recorded on the film pack.

2

Still further it is proposed to provide an arcuate shutter movably mounted across the lens and having a front portion with an opening normally aligned with the lens and arranged to be moved by the pivoted diagonal frame reflector when the reflector is moved to control the time the passage from the lens to the film pack will be open for recording the image.

Still another object of the invention proposes providing the arcuate shutter with a tail portion arranged to be moved across the lens opening, closing the same during the time that the reflector is moving back to its normal position, separating the rear and side walls.

Still another object of the invention proposes a novel means for pivoting the frame reflector and to control it by a depressible plunger in a manner to permit one compression of the plunger to accomplish an exposure of one film plate.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 4 is a sectional view taken on the line 4—4 of Fig. 2.

Fig. 5 is a perspective view of the shutter, per se.

Fig. 6 is a sectional view taken on the line 6—6 of Fig. 2.

Figure 1:
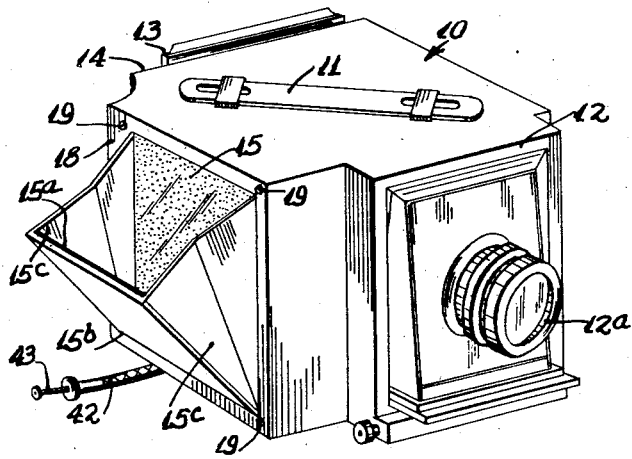
Fig. 1 is a perspective view of a photographic camera constructed in accordance with this invention.
Figure 3:
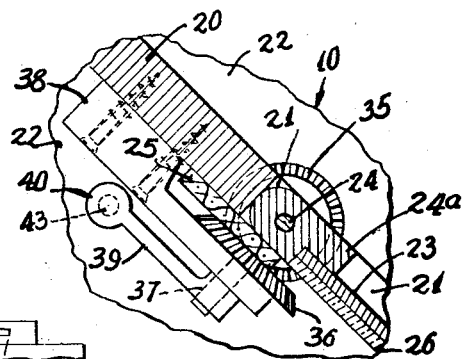
Fig. 3 is an enlarged detailed view of a portion of Fig. 2.

The photographic camera, according to this invention, includes a hollow light-proof body 10 provided at its top with a carrying strap 11. A lens 12ª is mounted through the front wall 12 of the body and a plate or film holder 13 is mounted on the rear wall 14 of the body 10. A ground glass 15 is mounted across an opening 16 formed in the side wall 17 of the body 10. The ground glass or light plate 15 is mounted within a recess formed in a frame 18. This frame 18 is positioned upon the side wall 17 of the body 10 and surrounds the opening 16. The frame 18 is secured in position by several screws 19.

The cover of a reversing mirror 15ª is mounted at its bottom edge to the bottom edge of the opening 16 of the ground glass plate 15 by means of a hinge 15ᵇ. The plate 15 and the upwardly extending sides of the cover of the reversing mirror 15ª and the opening 16 are connected together by accordion members 15ᶜ which limit the pivoting of the reversing mirror cover to an oblique position in which it extends from the said side wall. When this cover of the reversing mirror 15ª is in the open position the image passing through the lens 12ª will be reflected from the mirror 26 to the ground glass plate 15 and therefrom to the reversing mirror 15ª where it may be viewed at the bottom, horizontally in an upright position, by the operator of the camera for composing and focusing the same. When the camera is not being used the cover of the reversing mirror 15ª may be moved to its closed position.

The ground glass arrangement 15 may also be located at the rear wall of the body 10 for direct viewing of the subject which is to be photographed. In that event, the side opening 16 will be completely closed.

A fixed diagonal wall 20 is mounted across the interior of the body 10 from the top wall to the bottom wall and separates the back wall 14 from the side wall 17. The fixed diagonal wall 20 is formed with an opening 21 for the passage of light from the lens 12ª to the plate or film holder 13. The body 10 is formed with a bottom wall 22.

A light-proof frame 23 is extended across the opening 21 in the diagonal wall 20 and is pivotally mounted at one side, and more specifically, at its side adjacent the junction of the walls 14 and 17 upon a vertically extending shaft 24 by lugs 24ª. The frame 23 is arranged to swing across the lens 12ª and upon further movement, across the opening 16 provided with the ground glass 15.

Figure 2:
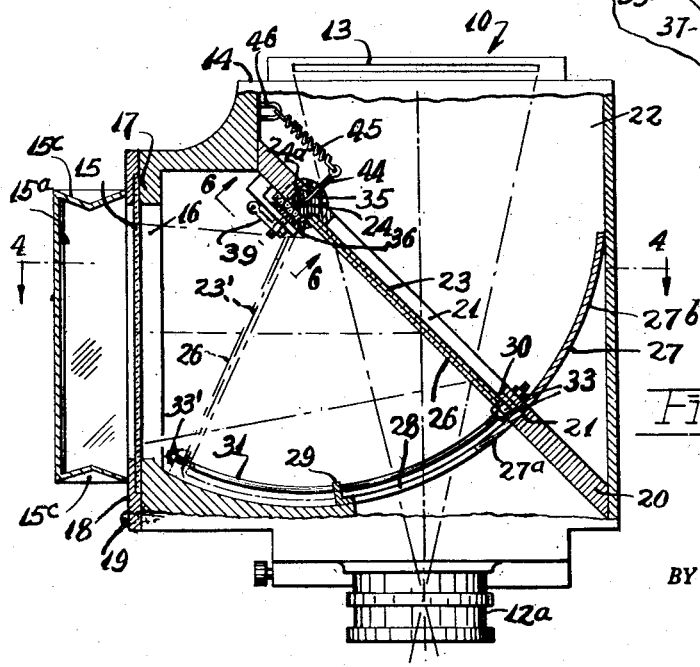
Fig. 2 is a plan view of Fig. 1 with a portion thereof broken away to reveal interior construction.
Figure 7:
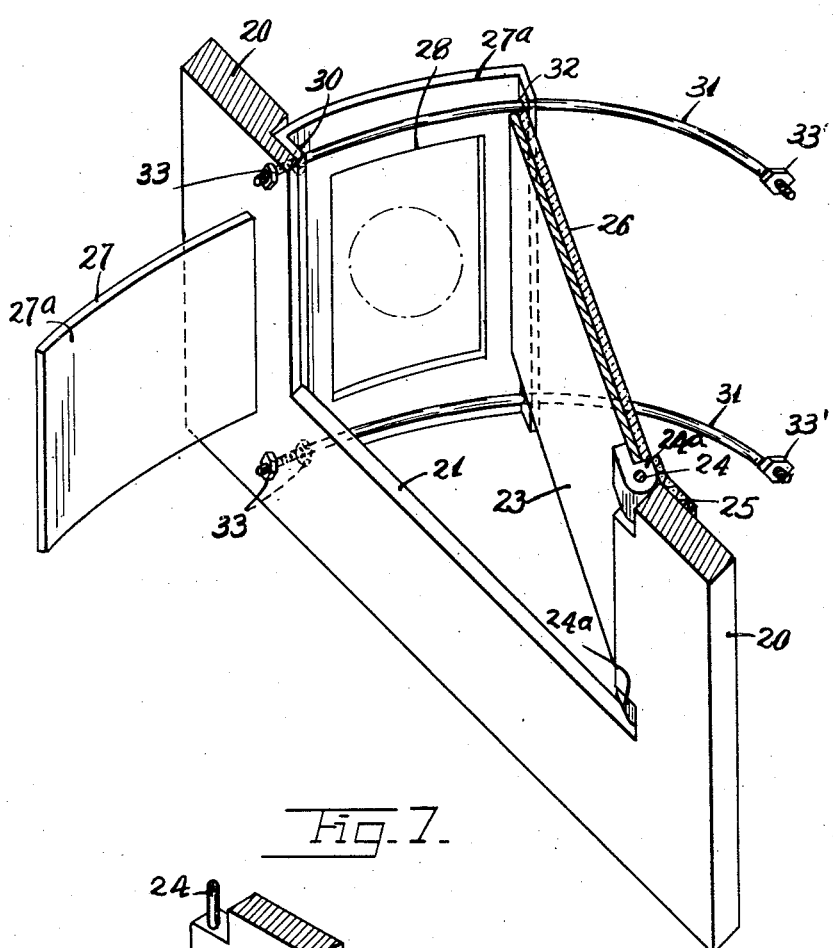
Fig. 7 is a schematic perspective view showing the shutter in partially moved position.

A piece of felt material 25 is secured in position over the contacting edges of the frame 23 and the diagonal wall 20 at the pivoted end of the frame 23 on the side adjacent the side walls 17 to prevent the passage of light through these adjacent surfaces. A mirror reflector 26 is mounted on the frame 23 on the side adjacent the ground glass 15 in a manner to reflect the light passing through the lens 12ª on to the ground glass 15 when the frame 23 is in its normal position within the opening 21 in the diagonal wall 20 as shown in Fig. 2. The pivoted position of the frame reflector 23 is illustrated by the dot and dash lines 23' in Fig. 2. When the reflector 23 is in this dot and dash position the opening 21 will be unobstructed, permitting light to pass from the lens 12ª to the film holder 13.

A shutter 27 is movably mounted across the lens 12ª and has a front portion 27ª formed with an opening 28 through which light is adapted to pass from the lens 12ª to the plate holder 13, or the mirror reflector 26. The shutter 27 also has an integral solid tail portion 27ᵇ. A front abutment element 29 is formed on the shutter 27 to the front of the opening 28 a rear abutment element 30 is formed on the shutter 27 to the rear of the opening 28.

The means for movably supporting the shutter 27 is characterized by arcuate track members 31. These arcuate track members are arranged adjacent the top and bottom of the opening 21 and each has one of its ends fixedly mounted in position on the fixed diagonal wall 20. The center portions of the arcuate track members 31 are extended through complementary openings 32 formed in the abutment elements 29 and 30. The arcuate track members 31 are secured to the diagonal wall 20 by lock nuts 33.

The free ends of the arcuate track members 31 are provided with stop nuts 33. Since the shutter 27 has an arcuate formation, it is possible to slidingly move the shutter along the arcuate track members 31 to align either the front portion 27ª or the tail portion 27ᵇ with the lens 12ª. The free end 23ª of the frame 23 extends between the track members 31 at a point between the abutment elements 29 and 30 of the shutter 27. The arrangement is such that when the frame 23 is moved from its normal position it will strike the front abutment element 29 and slidingly move the shutter in one direction to move the tail portion 27ᵇ into position across the lens 12ª. When the frame 23 moves in the other direction back to its starting position it will engage the rear abutment element 30 where it will light seal the tail portion 27ᵇ of the shutter 27, and slidingly move the shutter back to its starting position in which the front portion 27ª of the shutter will be again aligned with the lens 12ª.

Means is also provided for pivoting the frame 23. This means comprises a bevel gear 35 mounted on the bottom end of the shaft 24 which pivotally supports the frame 23. This bevel gear meshes with a second bevel gear 36 mounted upon a stud shaft 37. The stud shaft 37 is rotatively supported in a bracket 38 mounted upon the diagonal wall 20 above the bottom wall 22. The free end of the stud shaft 37 is formed with a radial arm 39 which is provided at its free end with an inverted cup-shaped member 40.

The bottom wall 22 of the camera body 10 is provided with the conventional opening 41 which is adapted to receive the threaded end of a conventional cable release 42. This cable release has a plunger 43 which extends upwards into the body 10 and more specifically, into the inverted cup-shaped member 40. Thus when the end of the cable release 42, which is shown in Fig. 1, is manually compressed in the conventional manner it will pivot the radial arm 39, turning the bevel gear 36. This will cause the bevel gear 35 to be turned and move the frame 23 from the full line position to the dot and dash lines position shown in Fig. 2. It is to be understood that the frame 23 is fixedly attached to the shaft 24 to move therewith when the shaft is turned.

Means is also provided for immediately returning the frame 23 to its starting position when the pressure upon the cable release 42 is relieved. This means comprises a radial arm 44 extending from one side of the frame 23 and to which one end of a contraction spring 45 is mounted. The other end of the contraction spring 45 is attached to a lug 46 mounted on the body 10 of the camera. The arrangement of the contraction spring 45 is such that it will be extended when the frame is moved to the dot and dash line position, so that the tension of the spring will tend to draw the frame 23 back to its starting position the moment the cable release is relieved.

The operation of this invention is as follows:
With the camera as it appears in the drawings, a film plate or pack is inserted into the holder 13 in the back wall of the camera 14. The operator then holds the camera with the lens 12ª directed at the subject. Light will pass through the lens 12ᵃ and be reflected by the mirror reflector 26 on the frame 23 to the ground glass 15.

The image of the subject will appear on the ground glass 15 and on the reversing mirror 15ᵃ. Then the focusing mechanism of the camera (not shown on the drawings) is adjusted to cause the image to appear sharply upon the ground glass and the reversing mirror. When the camera is properly focused it is ready to take the picture of the subject.

Actual picture taking is accomplished by pressing the cable release 42 to operate the transmission system to turn the shaft 24 and move the frame 23 from its full line position to its dot and dash line position, shown in Fig. 2. As this frame 23 moves to clear the passage through the opening 21 the free edge of the frame reflector will strike the abutment member 29 when the frame 23 reaches a position outside of the path of the light from the lens 12ᵃ to the film holder 13. During this time the opening 28 of the shutter 27 will be aligned with the lens, permitting the light to pass from the lens to the film holder. However, when the free edge of the frame 23 strikes the abutment 29 it will start moving the shutter 27 to bring the solid tail portion 23ᵇ into position across the lens 12ᵃ and break the passage from the lens 12ᵃ to the film pack 13, stopping the exposure of the film.

After the cable release 42 has been completely depressed it is again released and the tension of the spring 45 will start pivoting the frame 23 back to its starting position. When the free edge of the reflector approaches the rear abutment member 30 it will seal the light and will begin moving together with the shutter 27 including the tail portion 27ᵇ, back to its starting position in which the opening 28 will again be aligned with the lens 12ᵃ. It is to be understood that on this return motion the free edge of the frame 23 will be adjacent the back edge of the opening 28, light sealing that portion of the camera body within which the film is exposed. The exposed film 15 is then removed from the holder 13 and a fresh film inserted therein, permitting the picture taking procedure to be repeated.

The duration of the exposure period will be controlled by the size of the opening 28, and the rapidity of the pressure applied on the cable release 42.

Figure 8:
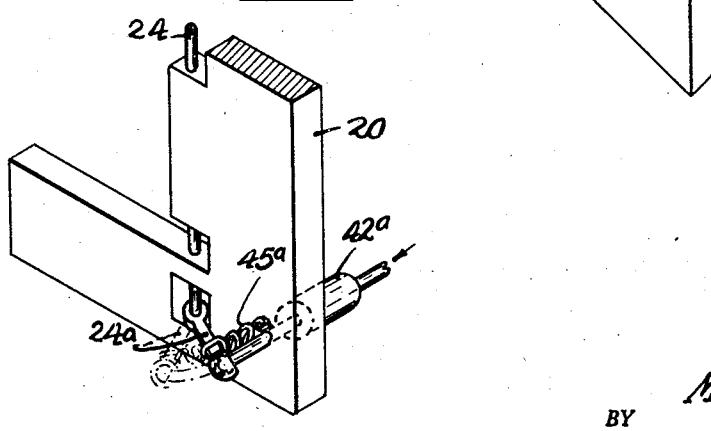
Fig. 8 is a fragmentary view, similar to Fig. 7, but illustrating another form of the invention.

In Fig. 8, the shaft 24 is shown with a short horizontal arm 24ᵃ, connected with a spring 45ᵃ to keep the reflector 23 in normal focusing position. In this arrangement, the reflector unit is operated by the cable release 42ᵃ which will turn the arm 24ᵃ and the reflector's shaft 24 when the cable release is pressed.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A device of the type described comprising a hollow lightproof body having a lens mounted through the front wall of said body, a removable light sensitive element mounted on the back wall of said body, a pair of spaced, parallel and arcuately shaped rods disposed in said body, one of said rods being positioned adjacent the plane of the top wall of said body and proximate to said front wall of said body, the other of said rods being disposed adjacent the plane of the bottom wall of said body and proximate said front wall of said body, means for securing the ends of each of said rods to said body, an arcuate shutter having an opening formed therein, a pair of spaced, radially inwardly extending abutments formed on said shutter each of which are provided with a pair of spaced apertures through which said rods project to form a support for the reciprocation thereon of said shutter, said abutments being disposed on opposite sides of said opening, and a tail piece for said shutter, said tail piece extending laterally from one of said abutments, and means engaging said abutments, alternately, for reciprocating said shutter on said rods.

2. A device of the type described comprising a hollow lightproof body having a lens mounted through the front wall of said body, a film or plate holder mounted on the back wall of said body, a ground glass mounted on a side wall of said body, a fixedly mounted frame member having an opening formed therein and extending diagonally across the interior of said body, a vertically disposed mirror pivotally connected at one of its ends with an edge of said opening, means disposed adjacent the pivoted end of said mirror for rotating said mirror horizontally about its pivot point to a plane substantially parallel to said glass, a pair of spaced, parallel and arcuately shaped rods, one of said rods being positioned adjacent the plane of the top wall of said body, the other of said rods being disposed adjacent the plane of the bottom wall of said body, means for securing one of the ends of each of said rods to said body, means for securing the other end of each of said rods to said frame, an arcuate shutter having an opening formed therein, a pair of spaced, radially inwardly extending abutments formed on said shutter each of which are provided with a pair of spaced apertures through which said rods project to form a support for the reciprocation thereon of said shutter, said abutments being disposed on opposite sides of said opening, and a tail piece for said shutter, said tail piece extending laterally from one of said abutments, the free end of said mirror being adapted, upon the pivotal movement thereof to alternately engage said abutments to reciprocate said shutter.

3. A device of the type described comprising a hollow lightproof body having a lens mounted through the front wall of said body, a film or plate holder mounted on the back wall of said body, a ground glass mounted on a side wall of said body, a vertically positioned mirror pivotally supported at one of its ends in said body, said mirror extending diagonally across said body, means disposed adjacent the pivoted end of said mirror for rotating said mirror horizontally about its pivot point to a plane substantially parallel to said glass, a pair of spaced rods, one of said rods being positioned adjacent the plane of the top wall of said body, the other of said rods being disposed adjacent the plane of the bottom wall of said body, means for fixedly mounting each of said rods in said body, an arcuate shutter having an opening formed therein, said shutter having a laterally extending tail piece, a pair of spaced, radially inwardly extending abutments formed on said shutter each of which are provided with a pair of spaced apertures through which said rods project to form a support for the reciprocation thereon of said shutter, said abutments being disposed on opposite sides of said opening, the free end of said mirror being adapted, upon the pivotal movement thereof to alternately engage said abutments to reciprocate said shutter.

4. A device of the type described comprising a hollow lightproof body having a lens mounted through the front wall of said body, a film or plate holder mounted on the back wall of said body, a ground glass mounted on a side wall of said body, a mirror having one of its ends pivotally mounted on said side wall at a point adjacent the bottom edge of said glass, bellows connecting oppositely disposed side edges of said mirror with said side wall, a vertically positioned mirror pivotally supported at one of its ends in said body, said mirror extending diagonally across said body, means disposed adjacent the pivoted end of said mirror for rotating said mirror horizontally about its pivot point to a plane substantially parallel to said glass, a pair of spaced rods, one of said rods being positioned adjacent the plane of the top wall of said body, the other of said rods being disposed adjacent the plane of the bottom wall of said body, means for securing said rods in said body, an arcuate shutter having an opening formed therein, a pair of spaced, radially inwardly extending abutments formed on said shutter each of which are provided with a pair of spaced apertures through which said rods project to form a support for the reciprocation thereon of said shutter, said abutments being disposed on opposite sides of said opening, and a tail piece for said shutter, said tail piece extending laterally from one of said abutments, the free end of said second mirror being adapted, upon the pivotal movement thereof to alternately engage said abutments to reciprocate said shutter.

5. A device of the type described comprising a hollow lightproof body having a lens mounted through the front wall of said body, a film or plate holder mounted on the back wall of said body, a ground glass mounted on a side wall of said body, a mirror having one of its ends pivotally mounted on said side wall at a point adjacent the bottom edge of said glass, bellows connecting oppositely disposed side edges of said mirror with said side wall, a fixedly mounted frame member having an opening formed therein and extending diagonally across the interior of said body, a vertically disposed mirror pivotally connected at one of its ends with an edge of said opening, means disposed adjacent the pivoted end of said mirror for rotating said mirror horizontally about its pivot point to a plane substantially parallel to said glass, and means for excluding light passage between said pivoted end of said mirror and the adjacent edge of said frame, a pair of spaced, parallel and arcuately shaped rods, one of said rods being positioned adjacent the plane of the top wall of said body, the other of said rods being disposed adjacent the plane of the bottom wall of said body, means for securing one of the ends of each of said rods to said body, means for securing the other end of each of said rods to said frame, an arcuate shutter having an opening formed therein, a pair of spaced, radially inwardly extending abutments formed on said shutter each of which are provided with a pair of spaced apertures through which said rods project to form a support for the reciprocation thereon of said shutter, said abutments being disposed on opposite sides of said opening, and a tail piece for said shutter, said tail piece extending laterally from one of said abutments, the free end of said second mirror being adapted, upon the pivotal movement thereof to alternately engage said abutments to reciprocate said shutter.

6. A device as described in claim 2, and supporting means for said tail piece, said supporting means comprising a second opening formed in said frame member in which said tail piece is slidably supported.

7. A photographic camera having a hollow lightproof body with a lens mounted through the front wall of said body, a plate or film holder on the back wall of said body, a ground glass mounted on the side wall of said body, a vertical frame extended diagonally between said lens and film holder, means on said frame for reflecting an image entering said body through said lens onto said ground glass, said frame being movably mounted and being movable to a position substantially parallel to said ground glass permitting the image to pass from said lens to said film holder, a shutter movably mounted across said lens and having a front portion normally aligned with said lens and formed with an opening permitting said image to enter said body and having a solid tail portion, a front abutment element on said shutter to the front of the opening in said shutter, and a rear abutment element on said shutter to the rear of the opening in said shutter, said frame having its free swinging edge disposed between said abutments to strike said front abutment when said frame moves towards said ground glass to move said shutter and position said tail portion across said lens and strike said rear abutment on its return movement to return said shutter to its starting position, said movable mounting of said shutter comprising rods mounted within said body concentric with the arcuate path followed by the free edge of said frame, said shutter being arcuate and extending parallel to said rods, said abutments being slidably supported on said rods by openings formed therein through which said tracks slidably extend, allowing the shutter element to be moved laterally from right to left or vice-versa.

MICHEL RESK.